Nov. 23, 1954     T. C. LLOYD ET AL     2,695,369

SUBMERSIBLE ELECTRIC MOTOR

Filed May 24, 1952

INVENTORS.
TOM C. LLOYD
AND SHELDON S.L. CHANG,
BY

Allen & Allen
ATTORNEYS.

United States Patent Office 2,695,369
Patented Nov. 23, 1954

2,695,369

SUBMERSIBLE ELECTRIC MOTOR

Tom C. Lloyd and Sheldon S. L. Chang, Springfield, Ohio, assignors to Robbins & Myers, Inc., Springfield, Ohio, a corporation of Ohio Application May 24, 1952, Serial No. 289,804

3 Claims. (Cl. 310—87)

This invention relates to a submersible electric motor, and more particularly to an electric motor as disclosed in our copending application, Serial No. 94,422 filed May 20, 1949, now Patent No. 2,629,076, February 17, 1953.

In said application we disclose a submersible transformer and a submersible electric motor and a combination of the two, particularly suitable for use in deep wells. The electric motor according to said application is designed to operate on an extremely low voltage, say one or two volts.

Any electric motor can be efficient only if the stator current is properly distributed in many slots along the air gap. It is therefore necessary to have many stator slots and many conductors. On the other hand, the most economic and efficient transformer for producing a rotating flux in the motor is of the type having three secondary conductors and three legs. In a submersible transformer it is of course desirable to keep the number of transformer terminals down to a minimum so that they may be properly sealed and to reduce the possibility of leakage.

An additional requirement in order that such a motor may operate properly is that the rotor flux linking each of the closed circuits in the motor be zero so as to reduce circulating current and the concomitant copper losses.

With the foregoing considerations in mind it is an object of our present invention to provide a submersible electric motor along the lines disclosed in our said copending application, which motor will be a low voltage high current motor, and in which the field windings will comprise heavy bars of electrically conductive material, and to provide for end connections for said heavy bars in such manner that the circulating currents in the closed circuits within the motor will be eliminated.

Further objects include the provision of a motor as outlined which will be inexpensive and simple in manufacture.

These and other objects of our invention which we shall disclose hereinafter, or which will be apparent to one skilled in the art upon reading these specifications, we accomplish by that construction an arrangement of parts of which we shall now disclose certain embodiments.

Reference is made to the drawings forming a part hereof, and in which.

It should be noted that ordinary induction motor windings are generally supplied by a three phase source, and that current is evenly distributed in the stator slots. However, the ordinary three phase motor windings have two coil sides for a stator slot so that even if there is only one turn per coil there are still two conductors in each slot, and these conductors must be insulated from each other. Such insulation causes complications in constructions and has the further great disadvantage of reducing the allowable net copper cross sectional area in the slot. With a single conductor in a slot it is possible to utilize 80% of the effective area. In other words, the total cross sectional area of the conductor (or conductors, if there are two or more parallel conductors in each slot) is 80% of the slot area. With two or more conductors in the slot the effective area is reduced to 40% or less because of the necessary added insulation, and because of the geometric factor. Furthermore, the phase coils of an ordinary winding are connected in series, which further complicates the end connections and multiplies the motor terminal voltage to such a high value that a transformer with a single turn secondary cannot give sufficient voltage to supply it unless it is made uneconomically long. The question also arises as to whether a motor with a comparatively high terminal voltage can be exposed to water or oil well mixtures.

The motor connections according to our present invention give a very low motor voltage, besides which they distribute the current satisfactorily and entirely eliminate circulating currents in parallel conductors. Furthermore, the connections according to the present invention are practical and easy to build.

Figure 1:
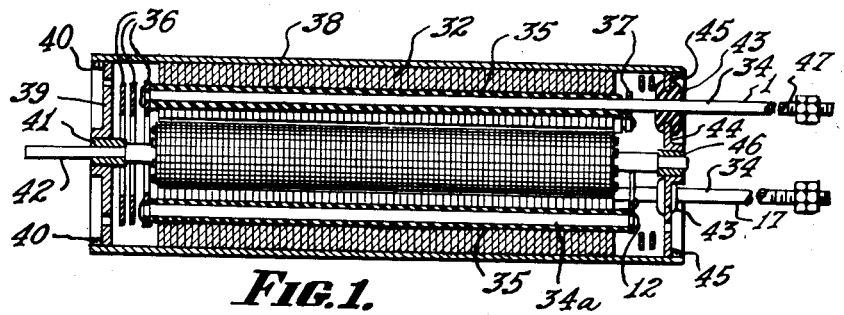
Figure 1 is a longitudinal central cross sectional view through a motor according to our invention.

In Figure 1 the laminae of the motor stator are indicated at 32. These laminae when stacked together constitute the stator of the motor. The assembled laminae are slotted in order to seat the field windings of the motor. These field windings comprise heavy bars 34 and 34a, of copper or other suitable electrically conductive material. The bars 34 and 34a may, if desired, be insulated from the laminations 32 by insulating sleeves 35.

It will be observed that the bars 34 extend out from the motor casing, while the bars 34a do not extend out from the casing. Thus, one bar 34 and a bar 34a together constitute one turn of the motor field windings. At the left hand end of the motor, as seen in Figure 1, the bars are interconnected by straps or jumpers generally indicated at 36. At the right hand end of the motor bars 34a are connected together by means of a jumper 37.

The motor is enclosed in a casing 38 having an end plate 39 secured thereto as by welding at 40. The plate 39 is provided with a suitable bearing 41 for the motor shaft 42. At the righthand end of the motor the bars 34 are held by insulated grommets 43 in an end plate member 44 which is secured to the motor casing as by welding as indicated at 45. The member 44 is provided with a suitable bearing 46 for the other end of the motor shaft 42. The motor shaft 42 carries a suitable rotor which may be of conventional design and construction and which need not be described in detail here since it forms no part of the present invention.

The rods 34 which constitute portions of the field coils are extended towards the right in Figure 1 and may be threaded as indicated at 47 in their extremities.

Since the motor herein described operates on extremely low voltage, there is no harm in permitting access of water to the interior. No shaft seals have been indicated, and as a matter of fact, the end plates 39 and 44 may be perforated as shown, or they may even be spiders.

An exemplary transformer suitable for use with the motor herein described is described in the said copending application. Furthermore, the motor may be connected to the transformer mechanically as disclosed in said copending application.

Coming now to a description of the motor stator connections we provide six slots per pole with one conductor per slot. The slots are of such a shape and size that a single conductor fits into it with proper clearance all around. The slots may be semi-opened or closed. Thus, if $p$ is the number of poles, and $n$ is the number of slots, then $n$ equals $6p$.

Taking up first the connections at the motor end which is away from the transformer, the connections are made in three layers. The stator slots are numbered in succession, 1, 2, 3, . . . $6p$ (24 in the embodiment illustrated). The first layer of connectors then connects up those conductors which are numbered $6m+1$ with those conductors which are numbered $6m+6$, where m equals 0, 1, 2, . . . $(p-1)$.

Thus, in the embodiment shown, 1 and 6 are connected, bars 7 and 12 are connected, bars 13 and 18 are connected, and bars 19 and 24 are connected.

In the second layer of connectors those conductors or bars which are numbered $6m+3$ are connected to those bars which are numbered $6m+8$. It will be understood that if the number calculates to more than $6p$, the quantity $6p$ is subtracted. Thus, in the embodiment shown, bars 3 and 8 are connected, bars 9 and 14 are connected, bars 15 and 20 are connected, and bars 21 and 2 are connected.

In the third layer those bars which are numbered $6m+5$ are connected to those which are numbered $6m+10$. Thus, in the embodiment disclosed, bars 5 and 10 are connected, bars 11 and 16 are connected, bars 17 and 22 are connected, and bars 23 and 4 are connected.

Figure 2:
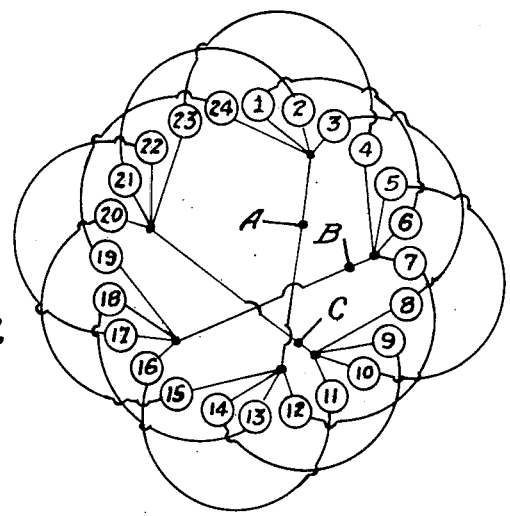
Figure 2 is a wiring diagram showing the field winding bars in end elevation and showing the connections at the transformer end of the motor inside the ring of bars and the connections at the far end of the motor on the outside of the ring of bars.
Figure 3:
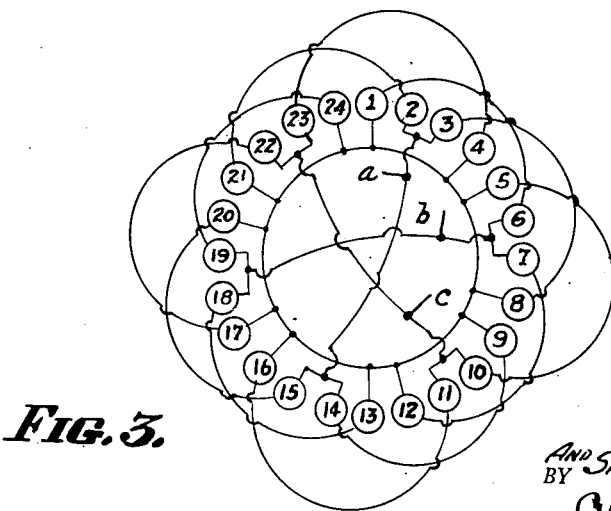
Figure 3 is a view similar to Figure 2 of a modification.

These connections are shown in Figures 2 and 3 by the arcs around the outside of the ring of numbered bars.

At the end of the motor adjacent the transformer the conductors may be connected in either of two ways. As shown in Figure 2, four consecutive bars numbered $6p$, 1, 2, and 3, and bars numbered as the last four mentioned numbers plus multiples of 12, are connected to one phase of the transformer. In the present example, therefore, bars 24, 1, 2, 3, 12, 13, 14 and 15 are connected to phase A.

The next four consecutive bars numbered 4, 5, 6, 7, and those same numbers plus multiples of 12, are connected to a second phase of the transformer. In the embodiment shown, bars 4, 5, 6, 7, 16, 17, 18 and 19 are connected to phase B of the transformer.

The next four consecutive bars numbered 8, 9, 10, and 11, and those same numbers plus multiples of 12, are connected to another phase of the transformer. In the embodiment shown those bars numbered 8, 9, 10, 11, 20, 21, 22, and 23 are connected to phase C of the transformer.

According to an alternative arrangement, and as best seen in Figure 3, the connections at the motor end of the transformer may be as follows: Those bars numbered $6p$, 1, 4, 5, 8, 9 and alternate pairs of bars are connected together. In the embodiment shown, bars 24, 1, 4, 5, 8, 9, 12, 13, 16, 17, 20 and 21 are all connected together. Then the bars numbered 2, 3, and those two numbers plus multiples of 12, are connected to one phase of the transformer; those bars numbered 6, 7, and those last two numbers plus multiples of 12, are connected to a second phase of the transformer; and those bars numbered 10 and 11, and these last two numbers plus multiples of 12, are connected to a third phase of the transformer. In the embodiment shown, bars 2, 3, 14 and 15 are connected to phase A; bars 6, 7, 18 and 19 are connected to phase B; and bars 10, 11, 22 and 23 are connected to phase C of the transformer.

The foregoing disclosure may be applied to a motor having any even number of poles, and it will be clear that any conductor can be numbered 1, as long as the other conductors are numbered in succession. Having once determined upon a system of numbering, however, this system of numbering must be retained throughout the connections described above.

When the conductor bars are connected as above described, it will be clear that there are produced a plurality of closed circuits within the motor, and that the circuits will be such that the total flux, due to the electric current from the transformer linking each of said closed circuits, will be zero. This matter may be proved mathematically, but the mathematical calculations are not set forth because they are not thought to be necessary to an understanding of the principles of this invention.

It will be understood that modifications may be made without departing from the spirit of our invention, and we therefore do not intend to limit ourselves otherwise than as set forth in the claims which follow.

Having now fully described our invention what we claim as new and desire to secure by Letters Patent, is:

1. A low voltage, high current submersible electric motor having single turn field windings, said windings comprising heavy bars of electrically conductive material connected together at one end in a plurality of groups such that, $p$ being the number of poles, and the bars being numbered successively from 1 to $6p$, and $m$ being equal to 0, 1, 2, ... $p-1$: in one group the bars numbered $6m+1$ are connected to the bars numbered $6m+6$; in the second group the bars numbered $6m+3$ are connected to the bars numbered $6m+8$; and in the third group the bars numbered $6m+5$ are connected to the bars numbered $6m+10$; the quantity $6p$ being subtracted whenever the numbering exceeds $6p$; the other ends of said bars being connected to the three phases of the transformer, such that: the bars numbered $6p$, 1, 2, 3 and said numbers plus multiples of 12 are connected to one phase; the bars numbered 4, 5, 6, 7, and said last four numbers plus multiples of 12 are connected to another phase; and the bars numbered 8, 9, 10, 11, and said last four numbers plus multiples of 12 are connected to a third phase; said bars and connections constituting a plurality of closed circuits, the total flux, due to the electrical current from said transformer linking each of said closed circuits, being zero.

2. A low voltage, high current submersible electric motor having single turn field windings, said windings comprising heavy bars of electrically conductive material connected together at one end in a plurality of groups such that, $p$ being the number of poles, and the bars being numbered successively from 1 to $6p$, and $m$ being equal to 0, 1, 2, ... $p-1$: in one group the bars numbered $6m+1$ are connected to the bars numbered $6m+6$; in the second group the bars numbered $6m+3$ are connected to the bars numbered $6m+8$; and in the third group the bars numbered $6m+5$ are connected to the bars numbered $6m+10$; the quantity $6p$ being subtracted whenever the numbering exceeds $6p$; the other ends of said bars being connected such that, said bars being divided into consecutive groups of two adjacent bars, alternate groups of two adjacent bars are connected together, and the remaining groups of two adjacent bars are connected, in repeated order, to the three phases of said transformer; said bars and connections constituting a plurality of closed circuits, the total flux, due to the electric current from said transformer linking each of said closed circuits, being zero.

3. A low voltage, high current submersible electric motor having single turn field windings, said windings comprising heavy bars of electrically conductive material connected together at one end in a plurality of groups such that, $p$ being the number of poles, and the bars being numbered successively from 1 to $6p$, and $m$ being equal to 0, 1, 2, ... $p-1$: in one group the bars numbered $6m+1$ are connected to the bars numbered $6m+6$; in the second group the bars numbered $6m+3$ are connected to the bars numbered $6m+8$; and in the third group the bars numbered $6m+5$ are connected to the bars numbered $6m+10$; the quantity $6p$ being subtracted whenever the numbering exceeds $6p$; the other ends of said bars being connected to the three phases of a transformer, such that: the bars numbered $6p$, 1; 4, 5; and alternate adjacent pairs of bars are connected together; the bars numbered 2, 3, and said last two numbers plus multiples of 12 are connected to one phase; the bars numbered 6, 7, and said last two numbers plus multiples of 12 are connected to another phase; and the bars numbered 10, 11, and said last two numbers plus multiples of 12 are connected to a third phase; said bars and connections constituting a plurality of closed circuits, the total flux, due to the electric current from said transformer linking each of said closed circuits, being zero.

References Cited in the file of this patent

UNITED STATES PATENTS

| Number | Name | Date |
| --- | --- | --- |
| 2,500,802 | Clark | Mar. 14, 1950 |

FOREIGN PATENTS

| Number | Country | Date |
| --- | --- | --- |
| 10,655 | Great Britain | of 1912 |